No. 752,258. PATENTED FEB. 16, 1904.
M. PRIETO.
MACHINE FOR CLEANING FIBERS.
APPLICATION FILED SEPT. 8, 1903.
NO MODEL. 2 SHEETS—SHEET 1.
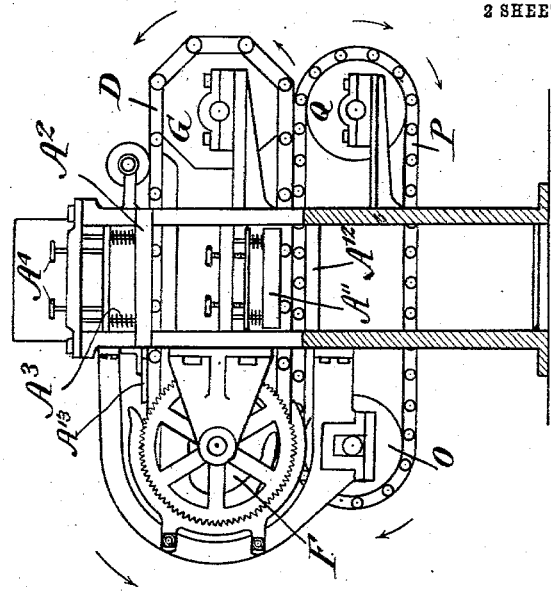
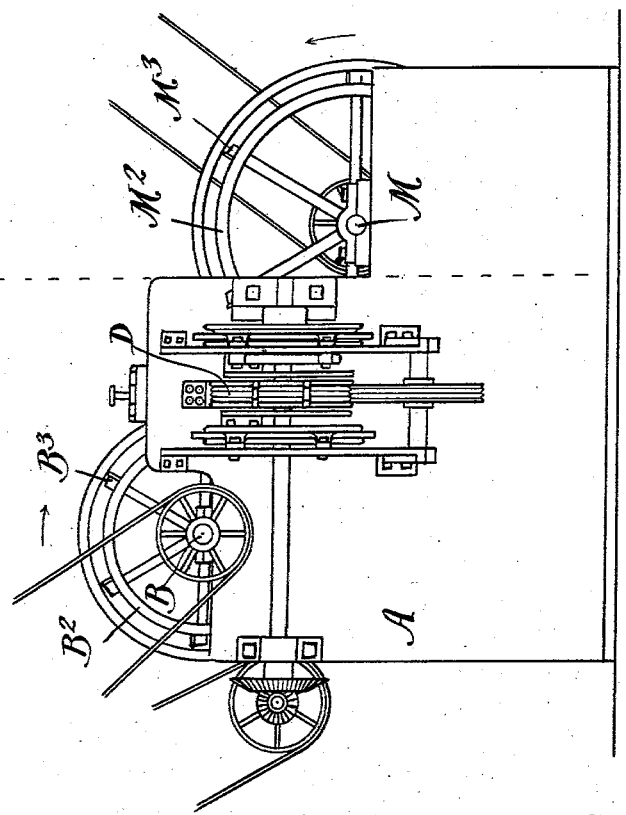
Witnesses
A. R. Appleman
M. F. Boyle
Inventor
Manuel Prieto
By his Attorney
Thomas Drew Stetson

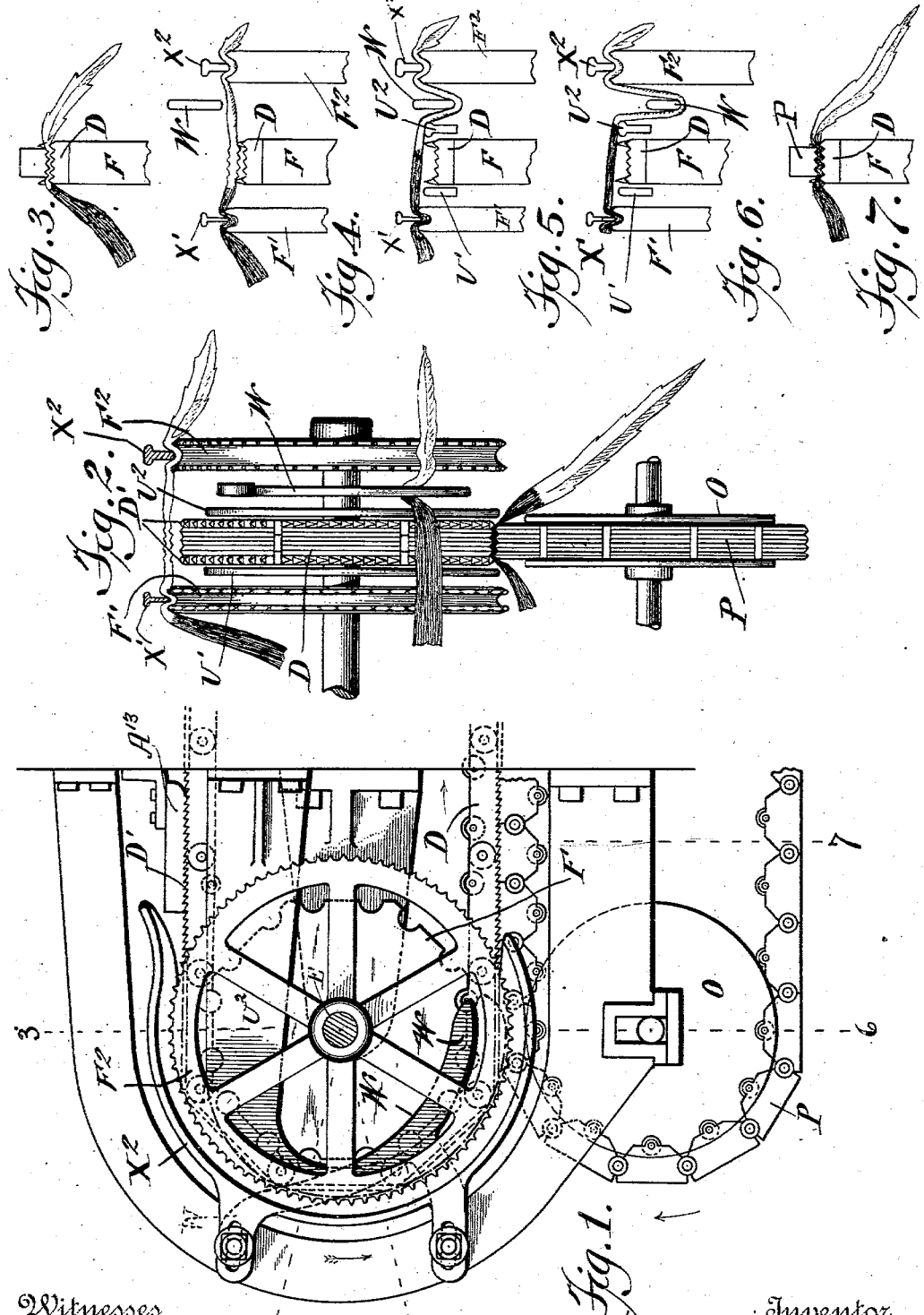

No. 752,258.

Patented February 16, 1904.

UNITED STATES PATENT OFFICE.

MANUEL PRIETO, OF MEXICO, MEXICO.

MACHINE FOR CLEANING FIBERS.

SPECIFICATION forming part of Letters Patent No. 752,258, dated February 16, 1904.

Application filed September 8, 1903. Serial No. 172,263. (No model.)

*To all whom it may concern:*

Be it known that I, MANUEL PRIETO, a citizen of the Republic of Mexico, residing in the city of Mexico, in the Republic of Mexico, have invented a certain new and useful Improvement in Machines for Cleaning Fibers, of which the following is a specification.

There is a class of plants, of which the several branches of the agave family are good types, which are indigenous and produced in great quantities in the tropical portions of the American continent, the leaves of which contain strong smooth fibers extending the whole length well adapted for important uses in cordage and other work. I will describe my invention as applied to treating the leaves of these plants. The skins and other portions of the leaves adhere strongly; but it has long been known and practiced to clean these fibers by subjecting the leaves one-half at a time to the action of powerful revolving beaters. Machinery invented by myself and others effects not only the beating, but also the holding of the leaves to carry them successively into the range of action of the beaters, to hold them against the strong pull to which they are subjected in the beating operation, and also to effect the change of conditions required to subject the leaves to a second treatment by the same or different beaters.

The present improvement applies to that class of machines. The leaves are held tightly by one end while the other end is beaten and the extraneous matter removed, and then before relaxing the grip on the untreated end the cleaned portion of the fiber is seized and the previously-untreated end of the leaf being beaten in its turn the fiber is delivered completely cleaned throughout its entire length.

I have devised important improvements in the provisions for holding the leaves during these operations and especially for effecting the change in the grip.

The following is a description of what I consider the best means of carrying out the invention.

The accompanying diagrams or outlines and the succeeding more complete drawings, including a series of successive sections all viewed in the direction of the feeding motion, form a part of this specification.

Outline A is a side view. Outline B is a section on the line $b\ b$ in outline A. The remaining figures are on a larger scale. Figure 1 is a side view of a portion with certain parts removed. Fig. 2 is a corresponding view in a plane at right angles thereto. The remaining figures represent successive sections through certain portions, all viewed in the same direction relatively to the motion. Fig. 3 is a section on the line E 3 in Fig. 1 seen from the right. Fig. 4 is a section on the plane E 4 seen from the same general direction. Fig. 5 is a section in the plane E 5. Fig. 6 is a section in the plane E 6, and Fig. 7 is a corresponding section on the line E 7 seen from the same general direction. The strained positions of the last figures are due to the views being all seen in the same general direction relatively to the motion. It is intended that the series shall represent the work in successive stages arranged favorably for comparison.

Similar letters of reference indicate corresponding parts in all the figures where they appear.

The invention is shown and will be described as applied to a machine of the general construction set forth in the United States patent to me, dated June 9, 1903, No. 730,701. That patent may be referred to for details additional to those herein set forth.

A is the fixed framing; B, a stout shaft; $B^2$, a drum carrying beaters $B^3$, which being driven by a steam-engine or other suitable power beat and clean short lengths of the butt-ends of the several leaves successively presented to them.

D is an endless chain which runs over two polygonal wheels F and G, slowly revolved. The leaves successively placed in positions transverse of the chain are engaged thereby and carried under a platen $A^2$, having springs $A^3$ for allowing it to yield if the pressure due to the passage of the leaf between it and the chain D becomes excessive and provisions $A^4$ for adjusting the tension of the springs. The outer surface of the several links of the chain D are grooved longitudinally, and the under surface of the platen $A^2$ is grooved longitudinally to match. Each edge of the bearing-surface of the chain outside of these smooth longitudinal grooves and ridges is toothed, as indicated by $D'$. These teeth engage the transversely-extended leaves and compel them to traverse with the movement of the chain. The grooving of the mid-width of the chain and the corresponding grooving of the platen aid in holding the leaf to resist the strong pull due to the action of the beaters.

When a leaf has been slowly carried past the beating-drum $B^2$, all that part of the leaf which extends beyond the chain into the path of its beaters has been efficiently cleaned. At a later stage in the treatment the previously-treated end of the leaf, which now has become reduced to a bunch of parallel fibers, is a second time strongly seized by the chain D, above described, which holds it firmly between itself and a second chain P, which runs over two wheels O and Q below and subjects the remainder of the leaf to the action of a second beating-drum $M^2$, carried on a shaft M. This drum may be in all respects similar to the first beating-drum $B^2$; but I prefer to make it somewhat larger. It acts in a corresponding manner on the portion of the leaf which is presented to it, but by its arrangement acts on the opposite side of the chain and is revolved in the opposite direction. It is important to allow the second beaters $M^3$ to clean quite up to the point at which the previous cleaning terminated. I accomplish the change in the holding and presenting the leaf between these two treatments by the following means: $A^{13}$ is what is practically an extension of the platen $A^2$. It holds the leaves lightly upon the chain D until they have passed considerably beyond the first beating-drum. On the same shaft E as the polygonal wheel F are firmly set two wheels $F'$ and $F^2$, one on each side of the wheel F. Each is grooved circumferentially, with the bottom of the groove smooth and exactly circular, and is radially toothed on each side. $X'$ is a holder extending about half around the wheel $F'$ and strongly supported on the frame of the machine. A holder $X^2$, which may, except for an important difference in the form of one edge, be similar to the holder $X'$, just described, but preferably thicker, is correspondingly matched on and within the groove in the periphery of the wheel $F^2$. These holders may, if preferred, be connected with the framing by springs; but my experiments indicate that there is sufficient elasticity in the mechanism if made plain, having simply provisions for adjusting the positions, to increase or reduce the pressure as the wear due to the use of the mechanism or differences in the leaves being treated may require. As the leaves commence to be carried downward half around the wheel F they come within the grip of these wheels $F'$ $F^2$ and their holders $X'$ $X^2$. After these parts have properly engaged with the leaf, one wheel, $F^2$, and its holder $X^2$ engaging the hard body of the untreated portion of the leaf and the other wheel, $F'$, and its holder $X'$ engaging the thin fibers which remain at the butt-end of the leaf after its first beating, the chain D temporarily ceases to have any material influence on the leaf, and if, as shown, the wheels $F'$ and $F^2$ and their accompanying holders are sufficiently large each leaf will be held substantially out of contact with the chain, subject to any other influence which may be brought to bear upon it. The inner edge of the holder $X^2$ is an arc (nearly half) of a perfect circle, and consequently the grip which is taken on the leaf when it enters between this holder and the wheel $F^2$ is continued uniformly. The inner edge of the holder $X'$ is concentric for only a small portion—say one-quarter—of the motion. It may hold for a sufficient time to aid in overcoming the adhesion of the leaf to the chain and detaching it therefrom. Beyond this point the inner edge is cut away or made of greater radius relatively to the wheel $F'$. As the leaf moves forward the grip of this holder is relaxed, so as to be practically inefficient except to act as a steadier of the cleaned fiber, which is all that remains of the previously-treated butt-end of the leaf.

$U'$ and $U^2$ are stationary liberators, which need have but little thickness, presenting smooth outer edges in the positions shown on each side, respectively, of the chain D, adapted to insure the lifting of the crushed leaf out of engagement with the chain so soon as the wheels $F'$ $F^2$ and their holders $X'$ $X^2$ have taken hold.

W is an important member of the mechanism, stationary except as it may require to be adjusted from time to time, curved inward between the liberator $U^2$ and the wheel $F^2$, and presenting a smooth inner edge. It is arranged to act camwise—that is to say, its edge $W'$ presses gently on the outer face of the leaf, and as the motion continues it bends and presses inward that portion of the leaf with which it is in contact. The shortening by the formation of a bight thus extending inward draws the loosely-held material, tending to contract equally from each end. As the untreated end is held while the treated end is free, the treated end alone yields, and the result shifts a sufficient length of the leaf transversely of the wheel $F'$, and consequently across the face of the chain. After this the chain D becomes again efficient and nips the previously-cleaned fibers between itself and the lower chain P these two chains, being traversed together between the platen $A^{11}$ and the fixed support $A^{12}$, hold the leaf with sufficient firmness by the slender fibers being firmly grasped between the two ridged surfaces, both moving, and allow the remainder of the leaf to be cleaned by the beating which is imparted by the beaters $M^3$. This second beating, as ordinarily conducted, treats a greater length of the leaf than the first. It is mainly for this reason that I prefer to have the second beating-drum $M^2$ of larger diameter than the first beating-drum $B^2$. It will be understood that each beating-drum has a curved bed against which the beaters can act efficiently in forcibly scraping the toughly-adhering meat and skin of the leaf away from the fiber. Also that there may be a casing covering the machine to prevent particles of solid matter and especially the acrid juices of the plant from flying off.

The liberator $U'$ is important because it insures the detachment of the leaf on the entering side, where there is liable to be formed a considerable shoulder by the presence of a stout untreated part of the leaf there. The liberator by lifting the leaf makes it ready to be easily drawn across the chain. The liberator $U^2$ is important because it lifts the leaf and holds it up out of the influence of the teeth on the side of the chain when the leaf is drawn along and deflected inward.

Modifications may be made without departing from the principle or sacrificing the advantages of the invention. The proportions of the machine may be varied. The chains D and P and the polygonal wheels F G and O Q, on which they are carried, may be wider or they may serve successfully if somewhat narrower than shown. The longitudinal ridges in the chains may be coarser or finer than shown. Also the marginal teeth on the chains may be larger or smaller. The drawings are intended to indicate about the proportions which my experiments establish as successful with ordinary leaves.

Parts of the invention can be used without others. I can dispense with the liberators $U'$ and $U^2$. The liberators when used may extend around so as to hold the crushed leaf out beyond any possible obstruction by the teeth on the chain during the entire period while the shifting is being effected. My experiments indicate that they are more useful with large leaves than with small. The wheels $F'$ and $F^2$ should be keyed or otherwise held adjustably, so that when some or all the leaves are very short the wheels may be set quite close together, leaving little more space than is required for the deflector and for the leaves as they are successively carried past it.

I claim as my invention—

1. In a machine for treating fibrous plants having a slowly-moved carrying-chain D with provisions for holding the leaves transversely therein, and two beaters acting in succession on the material which is allowed to extend on opposite sides of such chain, a polygonal wheel F carrying such chain, the combination therewith of a circular wheel $F^2$ alongside said wheel F, provisions for holding and carrying a leaf thereby, and a deflector W acting on the leaf to bend it in the space between said wheel $F^2$ and the chain D, provisions for relaxing the hold of the chain at one period, and provisions for tightening it again at a later stage and subjecting the leaf to the action of the second beater, all arranged to serve substantially as herein specified.

2. In a machine for treating fibrous plants having a slowly-moved carrying-chain D with provisions for receiving the leaves transversely, two sets of beaters acting in succession on the material which is allowed to extend on opposite sides of such chain, and a polygonal wheel F carrying such chain, the combination therewith, one on each side of said wheel F, of two circular wheels $F'$ $F^2$ and provisions for holding and carrying the leaf by each, and a deflector W acting on the leaf to bend it in the space between one of said wheels $F'$ $F^2$ and the chain D, provisions for relaxing the hold by the chain and also provisions for releasing the hold by one wheel while retaining the hold by the other wheel, and provisions for again taking hold by the chain and subjecting the leaf to the action of the second set of beaters, all substantially as herein specified.

3. In a machine for treating fibrous plants having a slowly-moved carrying-chain D with provisions for receiving the leaves transversely, two sets of beaters acting in succession on the material which is allowed to extend on opposite sides of such chain, and a polygonal wheel F carrying such chain, the combination therewith, one on each side of said wheel F, of two circular wheels $F'$ $F^2$ and provisions for holding the leaf by each, and a deflector W acting on the leaf to bend it in the space between one of said wheels $F'$ or $F^2$ and the chain D, provisions for relaxing the hold by one wheel while retaining the hold by the other wheel, a liberator $U'$ for detaching the leaf from the chain, and provisions for again taking hold by the chain and subjecting the leaf to the action of the second set of beaters, all substantially as herein specified.

4. In a machine for treating fibrous plants having a slowly-moved carrying-chain D with provisions for receiving the leaves transversely, two sets of beaters acting in succession on the material which is allowed to extend on opposite sides of such chain, and a polygonal wheel F carrying such chain, the combination therewith, one on each side of said wheel F, of two circular wheels $F'$ $F^2$ and provisions for holding the leaf by each, and a deflector W acting on the leaf to bend it in the space between one of said wheels $F'$ and $F^2$ and the chain D, provisions for relaxing the hold by one wheel while retaining the hold by the other wheel, a liberator $U'$ for detaching the leaf from the chain on one side and a liberator U² for both detaching the leaf and holding it up clear of the chain during the shifting movement, and provisions for again taking hold by the chain and subjecting the leaf to the action of the second set of beaters, all substantially as herein specified.

In testimony that I claim the invention above set forth I affix my signature in presence of two witnesses.

MANUEL PRIETO.

Witnesses:
C. LOUIS F. ROBINSON,
M. F. BOYLE.